United States Patent [19]

Fujinami et al.

[11] Patent Number: 4,533,805
[45] Date of Patent: Aug. 6, 1985

[54] MANUAL OPERATING DEVICE FOR A SLIDE TYPE ELECTRICAL DEVICE

[75] Inventors: Yoshio Fujinami, Hachioji; Katumi Itoyama, Hino; Hiroshi Ochiai, Fuchu, all of Japan

[73] Assignee: Tokyo Shibaura Denki Kabushiki Kaisha, Kanagawa, Japan

[21] Appl. No.: 548,151

[22] Filed: Nov. 2, 1983

[30] Foreign Application Priority Data

Jun. 28, 1983 [JP] Japan .............................. 58-98784[U]
Jun. 29, 1983 [JP] Japan ............................ 58-100480[U]

[51] Int. Cl.³ ...................... H01H 9/04; H01H 15/24
[52] U.S. Cl. .................................... 200/304; 200/330; 338/176; 338/184
[58] Field of Search ............... 338/176, 164, 184, 199; 200/304, 330, 331

[56] References Cited

U.S. PATENT DOCUMENTS 3,833,784  9/1974  Bobel et al. ...................... 200/330
3,997,968  12/1976  Czerner et al. ..................... 200/330
4,369,424  1/1983  Miyamoto ........................... 338/176

FOREIGN PATENT DOCUMENTS 2444994  4/1976  Fed. Rep. of Germany ...... 200/304

Primary Examiner—John W. Shepperd
Attorney, Agent, or Firm—Banner, Birch, McKie & Beckett

[57] ABSTRACT

A manual operating device for a slide type electrical device, which is mounted inside the housing of an electrical apparatus, includes a manual operating slide with an operating plate disposed at a hole in the housing. The manual operating device further includes a cover plate to cover the hole and provides a support on which the operating plate moves back and forth. A slide slot is formed by the cover plate and housing, and a connecting arm of the manual operating slide extends through the slide slot to connect the operating plate to an actuating slide of the slide type electrical device.

11 Claims, 8 Drawing Figures

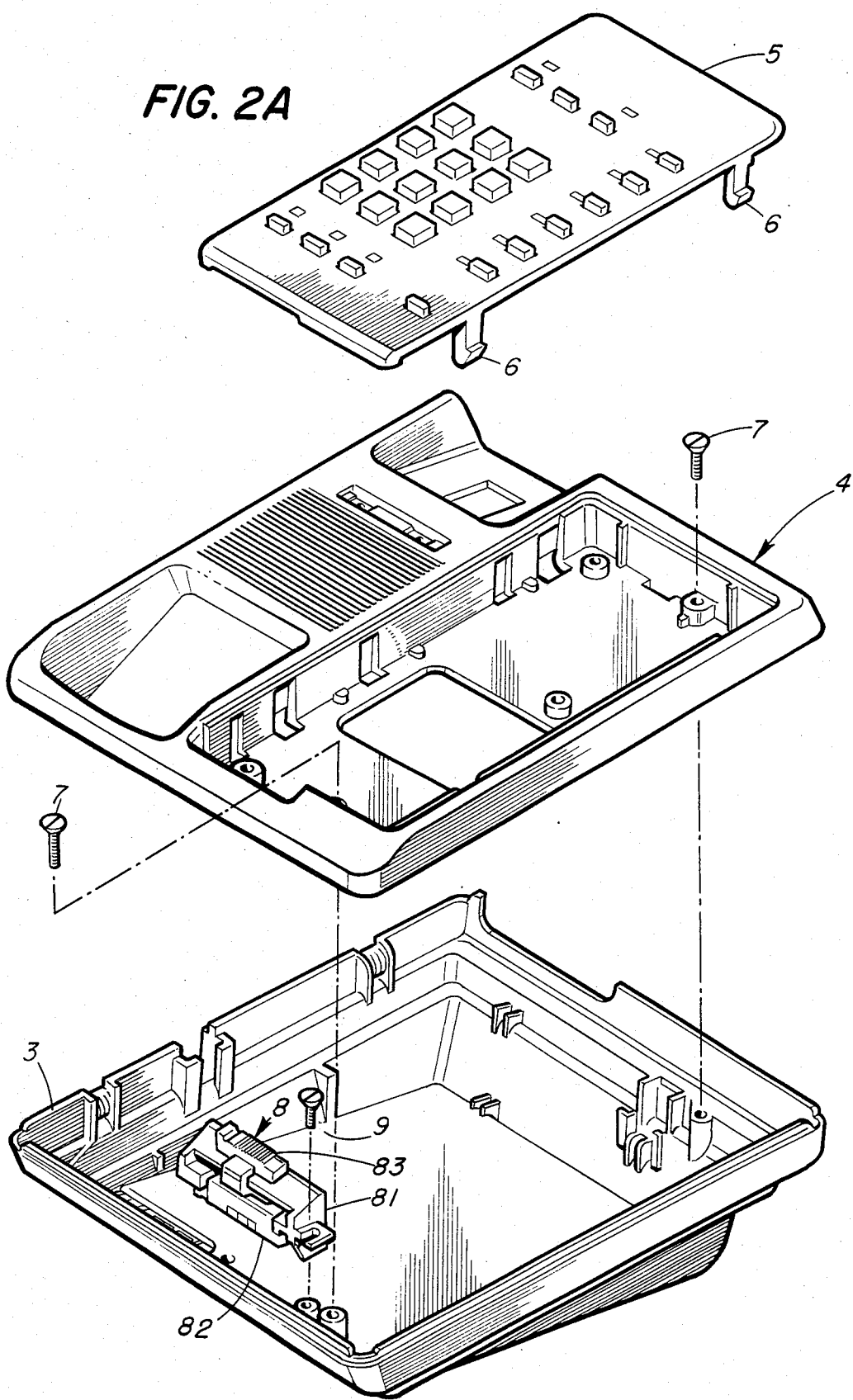

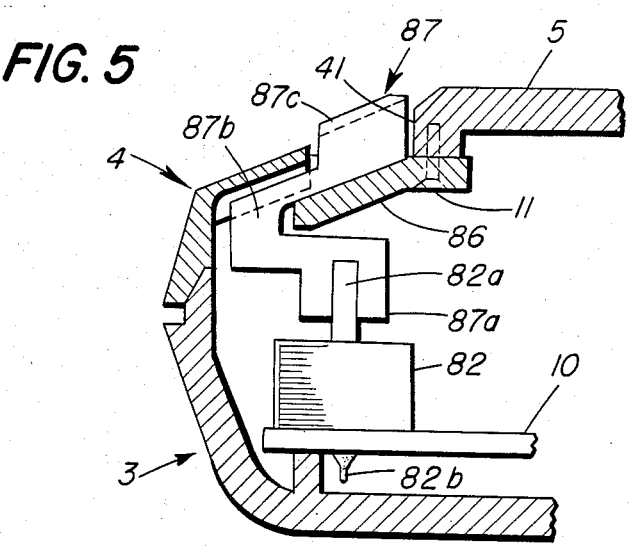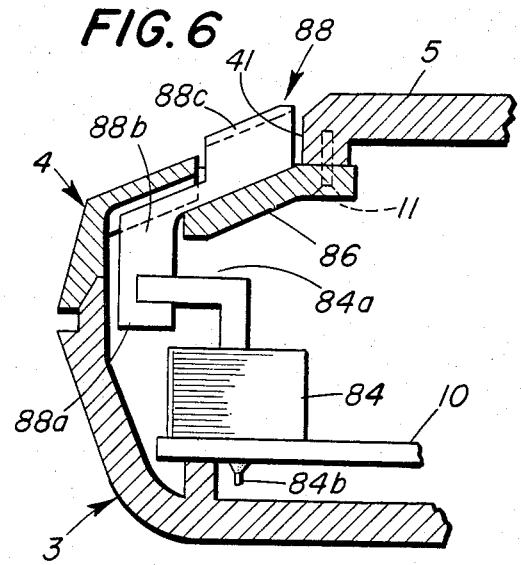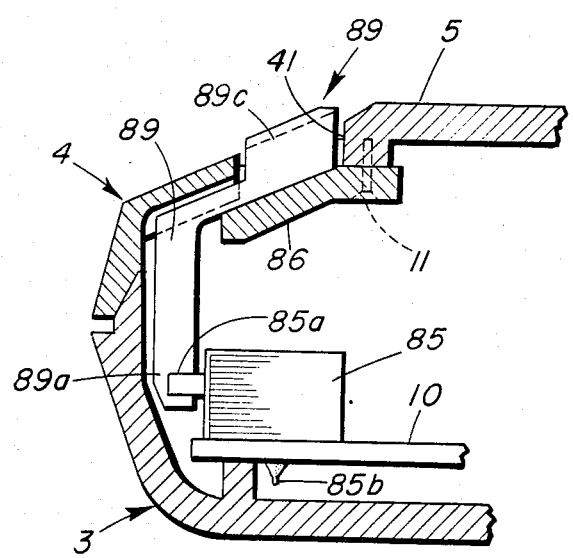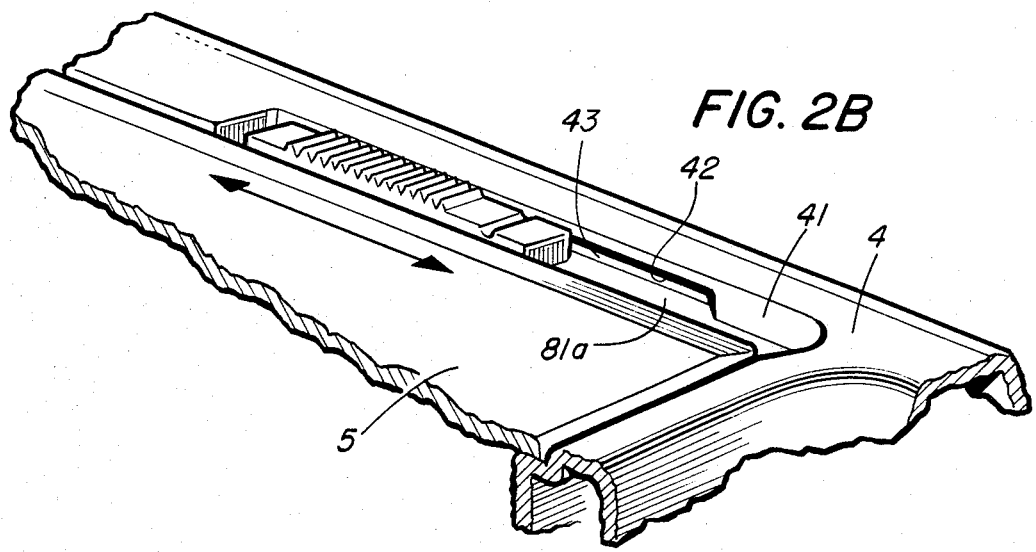

MANUAL OPERATING DEVICE FOR A SLIDE TYPE ELECTRICAL DEVICE

BACKGROUND OF THE INVENTION

This invention relates to a manual operating device for a slide type electrical device, such as a slide potentiometer or a slide switch, for use in an electrical apparatus.

In electrical apparatus, variable or slide type electrical devices often are used for adjusting the operation of electrical circuits. In such apparatus, the manual operating slide usually is placed on the surface of the housing for the electrical apparatus so that adjustment can be easily made.

The body of the slide type electrical device normally is mounted inside the housing of the electrical apparatus. The manual operating slide normally extends through a hole formed on the top surface of the housing and is connected to the actuating slide of the slide type electrical device. The hole is of sufficient size to permit the manual operating slide to move therein. However, the use of a hole in the housing can adversely affect the operation of the electrical circuits of the electrical apparatus. In particular, external static electricity can easily influence operation of circuit components such as FET devices because there is no barrier to static electricity at the hole. Also, the use of a hole does not present a good external appearance.

Attempts by the prior art to cover the hole in the housing primarily consist of either making the size of the operating slide twice as large as the hole or covering the hole with a gum cover having a slit through which the manual operating slide extends. However, gum covers have been found inadequate because, over time, these gum covers age and change shape so that they no longer keep the hole covered. The use of large sized operating slides has also been found unsatisfactory because these slides take up far too much space on the surface of the housing and because they are unattractive in appearance.

SUMMARY OF THE INVENTION

An object of the present invention is to provide an improved structure for attaching a slide type electrical device to an electrical apparatus. In particular, an object of the present invention is to provide a manual operating device for a slide type electrical device in an electrical apparatus which permanently covers the hole in the housing of the electrical apparatus for the manual operating device, while taking up a minimum amount of space and presenting an attractive appearance.

A further object of the present invention is to provide a manual operating device for a slide type electrical device which minimizes the application of any force on the actuating slide of the slide type electrical device in any direction other than the direction of movement of the actuating slide.

According to the present invention, and in order to realize the above objects, a manual operating device for a slide type electrical device in an electrical apparatus is provided. The electrical apparatus includes a housing with a hole for receiving the manual operating device. The manual operating device includes a cover plate positioned adjacent the hole on the inside of the housing. The cover plate has a cut-away portion along the hole to form a slide slot between the cover plate and the housing. The cover plate also has an area larger than the hole to completely cover the hole. A manual operating slide interacts with the cover plate. This manual operating slide includes an operating plate positioned on the top of the cover plate and a connecting arm extending through the slide slot to connect the operating plate to the actuating slide.

BRIEF DESCRIPTION OF THE DRAWINGS

FIG. 2a is an exploded view of the telephone apparatus shown in FIG. 1.

FIG. 2b is a perspective view of a hole in the housing of the telephone apparatus for receiving the manual operating device of the present invention.

FIG. 5, FIG. 6 and FIG. 7 are cross-sectional views of second, third and fourth embodiments of the manual operating device of the present invention.

DETAILED DESCRIPTION OF THE PREFERRED EMBODIMENTS

Figure 1:
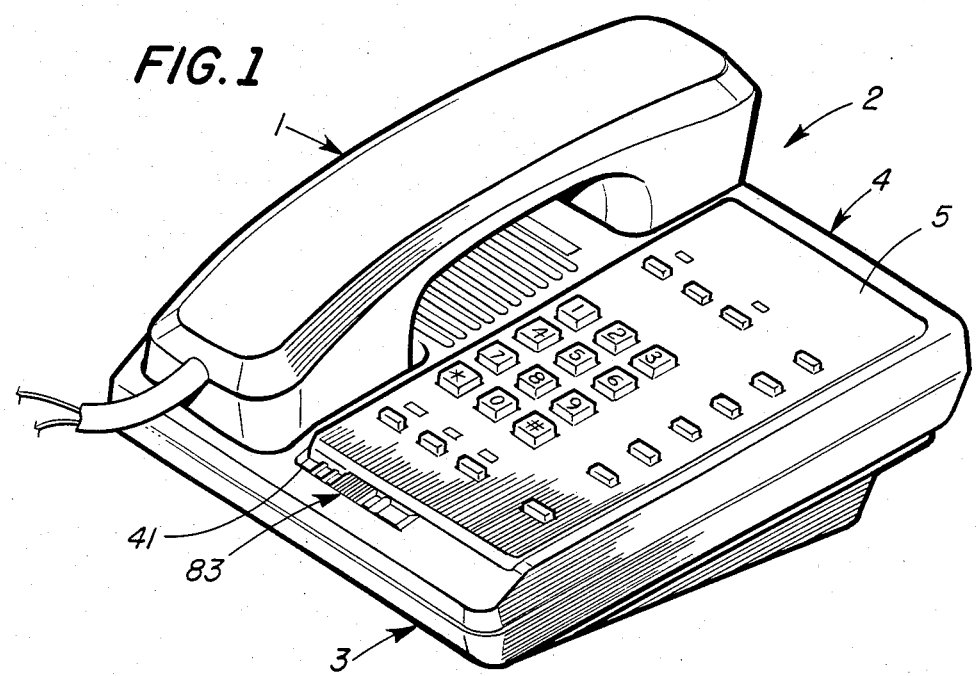
FIG. 1 is a perspective view of a telephone apparatus provided with a manual operating device according to the present invention.

A telephone apparatus, which is shown in FIG. 1 and FIG. 2a, includes hand set 1 and housing 2. Housing 2 includes base 3, top cover 4 and operating panel 5, which is attached to top cover 4 by hooks 6. Base 3 and top cover 4 are fastened together by screws 7.

Figure 3:
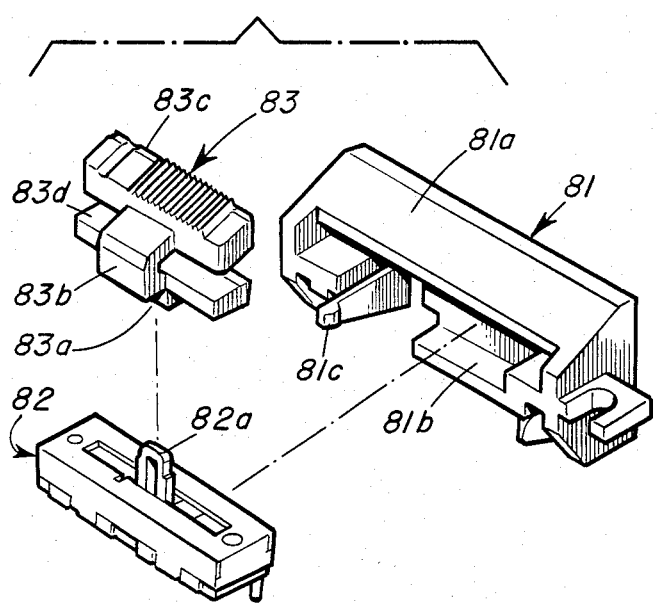
FIG. 3 shows an exploded view of a first embodiment of the manual operating device of the present invention.
Figure 4:
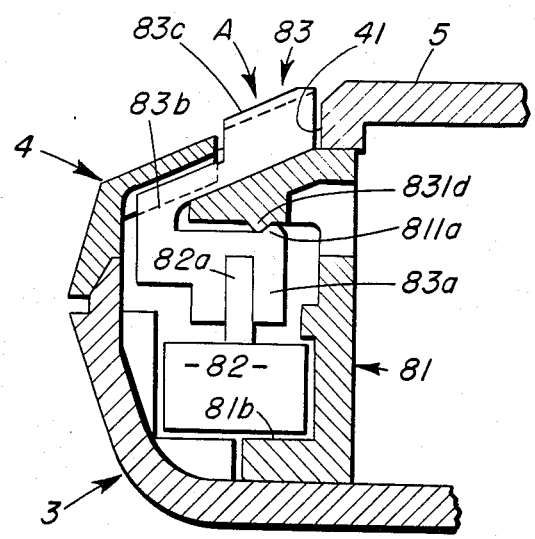
FIG. 4 is a cross-sectional view of the embodiment shown in FIG. 3.

Manual operating device 8, which is best shown in FIGS. 3-4, is mounted in housing 2 of the telephone apparatus shown in FIG. 1 and FIG. 2a at a position adjacent the bottom edge of operating panel 5. Manual operating device 8 includes holding frame 81, slide potentiometer 82 and manual operating slide 83. Holding frame 81 includes cover plate 81a and seat portion 81b for receiving and supporting potentiometer 82. Snaps 81c hold slide potentiometer 82 within seat portion 81b in the condition of a loose fit so as to take up the margin which accepts error of production. Holding frame 81 is fastened to base 3 of housing 2 by suitable fastening device 9. Slide potentiometer 82 includes actuating slide 82a which is movable back and forth to change the resistance of slide potentiometer 82.

Manual operating slide 83 includes connecting stem 83a, connecting arm 83b, operating plate 83c and lower plate 83d. Connecting stem 83a includes an aperture which receives actuating slide 82a and connecting arm 82b connects connecting stem 83a to operating plate 83c. Operating plate 83c rests on cover plate 81a of holding frame 81 and is movable back and forth on cover plate 81a by the operator of the telephone apparatus to change the resistance of slide potentiometer 82. Operating plate 83c has a substantially smaller cross-sectional area than cover plate 81a and connecting arm 83b has a width which is substantially smaller than the length of operating plate 83c.

As shown in FIG. 2b, cover plate 81a covers hole 41 in top cover 4 of housing 2. However, top cover 4 includes cut-away portion 42 along the side of hole 41 so that cover plate 81a and top cover 4 can form slide slot 43 therebetween through which connecting arm 83b extends. The length of cut-away portion 42 corresponds to the sum of the width of connecting arm 83b and the distance actuating slide 82a is capable of moving on slide potentiometer 82 so as to minimize the length of slide slot 43. Connecting arm 83b is generally U-shaped to extend around cover plate 81a of holding frame 81 to engage actuating slide 82a directly below cover plate 81a.

Lower plate 83d which is mounted on connecting arm 83b below cover plate 81a of holding frame 81 has the same length as operating plate 83c. Cover plate 81a and lower plate 83d have ridges 811a, 831d which lock together and on which cover plate 81a and lower plate 83d slide relative to each other.

When an operator operates operating plate 83c to change the resistance of slide potentiometer 83, various directional forces are applied to operating plate 83c. The force in the direction indicated by arrow A shown in FIG. 4 is received by cover plate 81a. The lateral force in the direction perpendicular to arrow A is received by top cover 4 and operating panel 5. Furthermore, in this embodiment, slide potentiometer 82 is held in holding frame 81 in a loose fit. Therefore, the application of any force on actuating slide 82a in any direction other than the direction of movement of actuating slide 82a is minimized.

In this embodiment, hole 41 for manual operating slide 83 is positioned adjacent the bottom edge of operating panel 5, which is attached to top cover 4 by hooks 6. Therefore, when removing operating panel 5 to repair the apparatus or exchange operating panels, one can easily remove operating panel 5 without a tool by inserting a fingertip into hole 41 to wrench open operating panel 5.

In the second, third and fourth embodiments of the present invention respectively shown in FIGS. 5, 6 and 7, circuit board 10, which is fixed inside housing 2, holds potentiometers 82, 84, 85 instead of holding frame 81 as disclosed in the first embodiment. Slide potentiometers 82, 84, 85 have connecting pins 82b, 84b, 85b which are soldered to circuit board 10. In this way, slide potentiometers 82, 84, 85 are fixedly held inside housing 2 and connected to the electrical circuit. Therefore, it is not required to use wire leads to connect the potentiometers to the electrical circuit. In these embodiments, cover plate 86 is a simple plate which is fastened to the end of operating panel 5 by suitable fastening device 11 or formed as part of the body of operating panel 5. Also, in these embodiments, manual operating slide 87, 88, 89 does not include a lower plate as in the first embodiment. Operating panel 5, to which cover plate 86 is fastened, is attached to top cover 4 so that one first inserts the bottom portion of operating panel 5, together with cover plate 86, and next inserts the top portion of operating panel 5.

In the second embodiment shown in FIG. 5, manual operating slide 87, which is the same as the manual operating slide of the first embodiment except for the lower plate, has connecting stem 87a, connecting arm 87b and operating plate 87c.

In the third embodiment shown in FIG. 6, actuating slide 84a of slide potentiometer 84 has an L-shape. Manual operating slide 88 has connecting stem 88a, substantially L-shaped connecting arm 88b and operating plate 88c. Connecting stem 88a includes an aperture in a horizontal direction which receives L-shaped actuating slide 84a. Connecting arm 88b connecting stem 88a to operating plate 88c.

In the fourth embodiment shown in FIG. 7, manual operating slide 89 is substantially the same as the third embodiment in that it includes connecting stem 89a, substantially L-shaped connecting arm 89b and operating plate 89c. However, actuating slide 85a of slide potentiometer 85 extends in a horizontal plane.

In the last three embodiments, the manual operating slide does not include the lower plate shown in the first embodiment. In particular, in the last two embodiments, the connecting arm of the manual operating slide is made of plastic and has a substantially L-shape so that it can be easily manufactured.

While in the foregoing specification, a few embodiments of the invention have been set forth for purposes of making a complete disclosure, it will be apparent to those skilled in the art that numerous changes may be made without departing from the spirit and principles of the invention.

We claim:

1. A manual operating device for a slide type electrical device in an electrical apparatus, said electrical apparatus including a housing having a hole, and said slide type electrical device having an actuating slide, said manual operating device comprising:
   a cover plate securely attached to the inside of said housing and positioned adjacent to said hole, said cover plate having an area larger than said hole and said housing having a cut-away portion along said hole to form a slide slot between said cover plate and said housing; and
   a manual operating slide having an operating plate and a connecting arm extending through said slide slot to connect said operating plate to said actuating slide of said slide type electrical device.

2. A manual operating device according to claim 1 wherein said manual operating slide has a cross-sectional area substantially smaller than said cover plate and said manual operating slide slides back and forth on top of said cover plate.

3. A manual operating device according to claim 1 wherein the width of said connecting arm is substantially smaller than the length of said cut-away portion of said housing to permit said manual operating slide to move said actuating slide of said slide type electrical device back and forth a distance corresponding to the distance said actuating slide is capable of moving on said slide type electrical device.

4. A manual operating device according to claim 3 wherein the length of said cut-away portion substantially corresponds to the sum of the width of said connecting arm and the distance said actuating slide is capable of moving on said slide type electrical device.

5. A manual operating device according to claim 3 wherein the size of said manual operating plate is substantially greater than said connecting arm to permit the operator to more easily grip said manual operating plate.

6. A manual operating device according to claim 1 further comprising a holding frame fixedly mounted on said housing, said holding frame including said cover plate and a seat to hold said slide type electrical device.

7. A manual operating device according to claim 6 wherein said holding frame further includes snaps adjacent said seat to retain said slide type electrical device on said seat, said seat and said snaps providing a loose fit for said slide type electrical device.

8. A manual operating device according to claim 1 wherein said connecting arm is generally U-shaped to extend around a portion of said cover plate to engage said actuating slide directly below said cover plate.

9. A manual operating device according to claim 8 wherein said manual operating slide further comprises a lower plate mounted on said connecting arm below said cover plate, said cover plate and said lower plate having interlocking ridges on which said cover plate and said lower plate slide relatively to each other.

10. A manual operating device according to claim 1 wherein said actuating slide has an L-shape and said connecting arm has a substantially L-shape which engages said L-shaped actuating slide.

11. A manual operating device according to claim 1 wherein said actuating slide extends in a horizontal plane and said connecting arm has a substantially L-shape which engages said actuating slide at the side of said slide type electrical device.

* * * * *